UNITED STATES PATENT OFFICE.

JOHN F. BOYNTON, OF SYRACUSE, NEW YORK.

IMPROVEMENT IN ORNAMENTATION OF THE SURFACES OF HARD MATERIAL.

Specification forming part of Letters Patent No. 197,088, dated November 13, 1877; application filed November 1, 1877.

*To all whom it may concern:*

Be it known that I, JOHN F. BOYNTON, of Syracuse, in the county of Onondaga and State of New York, have invented certain new and useful Improvements in Ornamentation of the Surfaces of Hard Material; and I do hereby declare that the following is a full, clear, and exact description thereof, which will enable others skilled in the art to which they appertain to make and use the same.

The object of this invention is to give ornamental tints or colors to hard materials, such as marine and other shells, pearls, mother-of-pearl, ivory, bone, horn, marbles, artificial stone, nuts, vegetable ivory, minerals, vulcanite, and similar substances used in forming plastic or molded articles, and such as are formed by cutting, carving, turning, or etching, to form jewelry, buttons, combs, buckles, dress ornaments, and the like.

Many of these substances have little or no color, and the condition of their surface is such as reflects the light imperfectly.

By my invention almost every shade, from the lightest yellow up to the deepest wine color, may be given to any of the hard substances hereinbefore enumerated, and the surface so changed as to give brilliantly-illuminated and iridescent reflecting-surfaces. Ordinary shells or the nacreous portions may be made to imitate amber and other more costly substances.

This invention consists in first freeing the material, or at least its surface, from moisture, and then impregnating the pores to a greater or less depth with one or more of the dry halogen elements, such as iodine, bromine, fluorine, or chlorine, or a compound radical equivalent thereto, such as cyanogen. Of these elements, iodine and bromine are most readily applied and give the finest results.

To carry out the invention I proceed as follows: The substance or article is first dried, by heated air or gas, so as to remove all free water or moisture. This may be done in an oven or kiln, care being taken not to raise the temperature so high as to injure the material or stain it. The heat thus applied expels all gases and moisture, expands the article, and opens its pores. While in a dry and heated condition the article is subjected to the vapor of the halogen till the pores are filled, and then allowed to cool while surrounded by the impregnating vapor. This may be done by placing the article in an iron, glass, or porcelain vase or oven, to which heat may be applied, so as to vaporize the impregnating material, if a solid, such as iodine, or a liquid, such as bromine, is used, and to confine the gas, if a gaseous element is used. For treating a large quantity a small muffler is convenient.

Instead of using the elements themselves, their solutions in alcohol, petroleum, or equivalent solvent, may be used, the object being to first expand the pores, and then fill them with the impregnating material and have it condensed therein.

After treatment any excess of condensation on the outside may be evaporated in a current of dry warm air.

The depth of color will depend upon the time during which the article is exposed in the vase or oven or muffler, and to the amount of the impregnating material used and absorbed.

When it is desired to preserve the natural color of the article in some portion, a stopping-out substance, such as wax, paraffine, or paint, may be applied to the portions to be preserved. In this way very beautiful designs may be fixed upon the surface of shell, bone, and other materials.

Having thus described my invention, I claim and desire to secure by Letters Patent of the United States—

1. The process herein described for ornamenting articles made of shell, bone, marble, or other hard substance, such as above mentioned, consisting in impregnating the surface with a halogen or equivalent, as set forth, as and for the purpose described.

2. The new manufacture herein described, consisting of shell, or similar material of a hard nature, ornamented by means of one or more halogens in its pores, as described.

In testimony that I claim the foregoing as my own I affix my signature hereto in presence of two witnesses.

JOHN F. BOYNTON.

Witnesses:
 THOS. S. MERCER,
 E. WILLARD SMITH.